United States Patent
Ma et al.

(10) Patent No.: US 9,293,997 B2
(45) Date of Patent: Mar. 22, 2016

(54) ISOLATED ERROR AMPLIFIER FOR ISOLATED POWER SUPPLIES

(71) Applicants: Shaoyu Ma, Beijing (CN); Tianting Zhao, Beijing (CN); Baoxing Chen, Westford, MA (US)

(72) Inventors: Shaoyu Ma, Beijing (CN); Tianting Zhao, Beijing (CN); Baoxing Chen, Westford, MA (US)

(73) Assignee: ANALOG DEVICES GLOBAL, Hamilton (BM)

( * ) Notice: Subject to any disclaimer, the term of this patent is extended or adjusted under 35 U.S.C. 154(b) by 293 days.

(21) Appl. No.: 13/803,833

(22) Filed: Mar. 14, 2013

(65) Prior Publication Data

US 2014/0268917 A1 Sep. 18, 2014

(51) Int. Cl.
H02M 3/335 (2006.01)
(52) U.S. Cl.
CPC ...... *H02M 3/33523* (2013.01); *H02M 3/33515* (2013.01); *Y02B 70/1483* (2013.01)
(58) Field of Classification Search
CPC .................. H02M 2001/0006; H02M 1/36
USPC .................. 330/9, 10, 136, 151, 188, 207 A; 363/13, 16, 17, 21.12, 21.15, 97
See application file for complete search history.

(56) References Cited

U.S. PATENT DOCUMENTS

| | | | |
|---|---|---|---|
| 3,058,078 A | 10/1962 | Hoh | |
| 3,537,022 A | 10/1970 | Regan | |
| 3,583,378 A | 6/1971 | Pattee | |
| 3,602,801 A | 8/1971 | Williamson | |
| 3,714,540 A | 1/1973 | Galloway | |
| 3,736,434 A | 5/1973 | Darrow | |
| 3,760,198 A | 9/1973 | Mori et al. | |
| 3,798,608 A | 3/1974 | Huebner | |
| 3,808,673 A | 5/1974 | Bottini | |
| 3,875,483 A | 4/1975 | Farr | |
| 4,024,452 A | 5/1977 | Seidel | |
| 4,027,152 A | 5/1977 | Brown et al. | |
| 4,035,710 A | 7/1977 | Joyce | |
| 4,065,713 A | 12/1977 | Pollmeier | |
| 4,118,603 A | 10/1978 | Kumhyr | |
| 4,159,431 A | 6/1979 | Roozenbeek et al. | |
| 4,227,045 A | 10/1980 | Chelcun et al. | |
| 4,273,051 A | 6/1981 | Stratton | |

(Continued)

FOREIGN PATENT DOCUMENTS

| DE | 2529296 A1 | 1/1977 |
|---|---|---|
| DE | 3501052 A1 | 7/1986 |

(Continued)

OTHER PUBLICATIONS

Office Action issued in DE Patent Appln. No. 102014103090.7, dated Nov. 14, 2014, 5 pages (EN translation).

(Continued)

*Primary Examiner* — Adolf Berhane
*Assistant Examiner* — Afework Demisse
(74) *Attorney, Agent, or Firm* — Kenyon & Kenyon LLP

(57) ABSTRACT

A power converter may include an amplifier that generates an error signal, a modulator that generates a modulated error signal, an isolator that generates an isolated modulated error signal, and a demodulator that generates an isolated error signal, which may be substantially proportional to the difference between the output signal and the reference signal, and a controller that controls a power stage to generate the output signal of the power converter.

20 Claims, 6 Drawing Sheets

(56) References Cited

U.S. PATENT DOCUMENTS

| | | |
|---|---|---|
| 4,275,404 A | 6/1981 | Cassiday et al. |
| 4,302,807 A | 11/1981 | Mentler |
| 4,318,170 A | 3/1982 | Cabalfin |
| 4,443,839 A | 4/1984 | Onodera et al. |
| 4,475,149 A | 10/1984 | Gallios |
| 4,489,357 A | 12/1984 | Van Ooijen et al. |
| 4,538,136 A | 8/1985 | Drabing |
| 4,547,961 A | 10/1985 | Bokil et al. |
| 4,554,462 A | 11/1985 | Komiya et al. |
| 4,564,768 A | 1/1986 | Komiya et al. |
| 4,660,014 A | 4/1987 | Wenaas et al. |
| 4,677,534 A | 6/1987 | Okochi |
| 4,703,283 A | 10/1987 | Samuels |
| 4,709,315 A | 11/1987 | Ramos |
| 4,720,667 A | 1/1988 | Lee et al. |
| 4,731,720 A | 3/1988 | Takahashi |
| 4,742,470 A | 5/1988 | Juengel |
| 4,748,419 A | 5/1988 | Somerville |
| 4,755,922 A | 7/1988 | Puvogel |
| 4,780,795 A | 10/1988 | Meinel |
| 4,785,345 A | 11/1988 | Rawls et al. |
| 4,817,865 A | 4/1989 | Wray |
| 4,818,855 A | 4/1989 | Mongeon et al. |
| 4,825,450 A | 4/1989 | Herzog |
| 4,835,486 A | 5/1989 | Somerville |
| 4,859,877 A | 8/1989 | Cooperman et al. |
| 4,885,582 A | 12/1989 | LaBarge et al. |
| 4,912,617 A | 3/1990 | Hartmann et al. |
| 4,920,474 A | 4/1990 | Bruning et al. |
| 4,922,883 A | 5/1990 | Iwasaki |
| 4,924,210 A | 5/1990 | Matsui et al. |
| 4,937,468 A | 6/1990 | Shekhawat et al. |
| 4,945,264 A | 7/1990 | Lee et al. |
| 4,959,631 A | 9/1990 | Hasegawa et al. |
| 5,041,780 A | 8/1991 | Rippel |
| 5,057,968 A | 10/1991 | Morrison |
| 5,070,317 A | 12/1991 | Bhagat |
| 5,095,357 A | 3/1992 | Andoh et al. |
| 5,097,371 A | 3/1992 | Somers |
| 5,102,040 A | 4/1992 | Harvey |
| 5,126,714 A | 6/1992 | Johnson |
| 5,128,729 A | 7/1992 | Alonas et al. |
| 5,142,432 A | 8/1992 | Schneider |
| 5,164,621 A | 11/1992 | Miyamoto |
| 5,184,103 A | 2/1993 | Gadreau et al. |
| 5,204,551 A | 4/1993 | Bjornholt |
| 5,270,882 A | 12/1993 | Jove et al. |
| 5,293,400 A | 3/1994 | Monod et al. |
| 5,321,321 A | 6/1994 | Kurisu |
| 5,327,030 A | 7/1994 | DeVito et al. |
| 5,329,225 A | 7/1994 | Roshen et al. |
| 5,334,882 A | 8/1994 | Ting |
| 5,339,061 A | 8/1994 | Reick |
| 5,353,001 A | 10/1994 | Meinel et al. |
| 5,369,666 A | 11/1994 | Folwell et al. |
| 5,384,808 A | 1/1995 | Van Brunt et al. |
| 5,387,551 A | 2/1995 | Mizoguchi et al. |
| 5,394,319 A | 2/1995 | Attwood et al. |
| 5,396,394 A | 3/1995 | Gee |
| 5,430,641 A | 7/1995 | Kates |
| 5,445,922 A | 8/1995 | Maple |
| 5,450,305 A | 9/1995 | Boys et al. |
| 5,467,607 A | 11/1995 | Harvey |
| 5,469,098 A | 11/1995 | Johnson, Jr. |
| 5,478,773 A | 12/1995 | Dow et al. |
| 5,484,012 A | 1/1996 | Hiratsuka |
| 5,498,995 A | 3/1996 | Szepesi et al. |
| 5,502,430 A | 3/1996 | Takahashi et al. |
| 5,533,054 A | 7/1996 | DeAndrea et al. |
| 5,539,241 A | 7/1996 | Abidi et al. |
| 5,539,598 A | 7/1996 | Denison et al. |
| 5,548,265 A | 8/1996 | Saito |
| 5,572,179 A | 11/1996 | Ito et al. |
| 5,588,021 A | 12/1996 | Hunt et al. |
| 5,596,466 A | 1/1997 | Ochi |
| 5,636,110 A | 6/1997 | Lanni |
| 5,650,357 A | 7/1997 | Dobkin et al. |
| 5,701,037 A | 12/1997 | Weber et al. |
| 5,714,938 A | 2/1998 | Schwabl |
| 5,716,323 A | 2/1998 | Lee |
| 5,731,954 A | 3/1998 | Cheon |
| 5,774,350 A | 6/1998 | Notaro et al. |
| 5,774,791 A | 6/1998 | Strohallen et al. |
| 5,777,861 A | 7/1998 | Shimizu et al. |
| 5,781,071 A | 7/1998 | Kusunoki |
| 5,781,077 A | 7/1998 | Leitch et al. |
| 5,786,979 A | 7/1998 | Douglass |
| 5,801,602 A | 9/1998 | Fawal et al. |
| 5,812,598 A | 9/1998 | Sharma et al. |
| 5,825,259 A | 10/1998 | Harpham |
| 5,831,426 A | 11/1998 | Black, Jr. et al. |
| 5,831,525 A | 11/1998 | Harvey |
| 5,877,667 A | 3/1999 | Wollesen |
| 5,900,683 A | 5/1999 | Rinehart et al. |
| 5,900,764 A | 5/1999 | Imam et al. |
| 5,903,183 A | 5/1999 | Inukai |
| 5,926,358 A | 7/1999 | Dobkin et al. |
| 5,942,937 A | 8/1999 | Bell |
| 5,952,849 A | 9/1999 | Haigh |
| 5,969,590 A | 10/1999 | Gutierrez |
| 5,982,645 A | 11/1999 | Levran et al. |
| 5,990,753 A | 11/1999 | Danstrom et al. |
| 5,998,979 A | 12/1999 | Nilsson |
| 6,000,128 A | 12/1999 | Umeno et al. |
| 6,008,102 A | 12/1999 | Alford et al. |
| 6,025,705 A | 2/2000 | Nguyen et al. |
| 6,040,986 A | 3/2000 | Sakamoto et al. |
| 6,054,780 A | 4/2000 | Haigh et al. |
| 6,054,914 A | 4/2000 | Abel et al. |
| 6,069,802 A | 5/2000 | Priegnitz |
| 6,087,882 A | 7/2000 | Chen et al. |
| 6,104,003 A | 8/2000 | Jones |
| 6,124,756 A | 9/2000 | Yaklin et al. |
| 6,198,374 B1 | 3/2001 | Abel |
| 6,208,531 B1 | 3/2001 | Vinciarelli et al. |
| 6,262,600 B1 | 7/2001 | Haigh et al. |
| 6,266,254 B1 | 7/2001 | Ohtake |
| 6,291,907 B1 | 9/2001 | Haigh et al. |
| 6,303,971 B1 | 10/2001 | Rhee |
| 6,317,338 B1 | 11/2001 | Boys |
| 6,344,979 B1 | 2/2002 | Huang et al. |
| 6,356,183 B1 | 3/2002 | Jou |
| 6,432,818 B1 | 8/2002 | Akram et al. |
| 6,501,363 B1 | 12/2002 | Hwu et al. |
| 6,504,732 B2 | 1/2003 | Abe |
| 6,525,566 B2 | 2/2003 | Haigh et al. |
| 6,538,532 B2 | 3/2003 | Petrovic |
| 6,542,385 B1 | 4/2003 | Emmons et al. |
| 6,603,383 B2 | 8/2003 | Gevorgian et al. |
| 6,606,260 B2 | 8/2003 | Ahlstrom |
| 6,621,365 B1 | 9/2003 | Hallivuori et al. |
| 6,686,768 B2 | 2/2004 | Comer |
| 6,720,816 B2 | 4/2004 | Strzalkowski |
| 6,728,320 B1 | 4/2004 | Khasnis et al. |
| 6,738,240 B1 | 5/2004 | Ahn et al. |
| 6,747,421 B2 | 6/2004 | Kohn |
| 6,765,809 B2 | 7/2004 | Komori |
| 6,807,070 B2 | 10/2004 | Ribarich |
| 6,873,065 B2 | 3/2005 | Haigh et al. |
| 6,903,578 B2 | 6/2005 | Haigh et al. |
| 6,911,848 B2 | 6/2005 | Vinciarelli |
| 6,911,860 B1 | 6/2005 | Wang et al. |
| 6,922,080 B2 | 7/2005 | Haigh et al. |
| 6,927,662 B2 | 8/2005 | Kahlmann et al. |
| 6,992,871 B2 | 1/2006 | Ahn et al. |
| 6,993,087 B2 | 1/2006 | Rosnell et al. |
| 7,061,189 B2 | 6/2006 | Newman, Jr. et al. |
| 7,075,329 B2 | 7/2006 | Chen et al. |
| 7,098,766 B2 | 8/2006 | Gardner et al. |
| 7,116,183 B2 | 10/2006 | Wu |
| 7,171,739 B2 | 2/2007 | Yang et al. |
| 7,199,562 B2 | 4/2007 | Muterspaugh |
| 7,253,565 B2 | 8/2007 | Kang et al. |
| 7,262,680 B2 | 8/2007 | Wang |

(56) References Cited

U.S. PATENT DOCUMENTS

| | | | |
|---|---|---|---|
| 7,298,238 B1 | 11/2007 | Eaton et al. |
| 7,302,247 B2 | 11/2007 | Dupuis |
| 7,345,896 B2 | 3/2008 | Dalal |
| 7,376,212 B2 | 5/2008 | Dupuis |
| 7,421,028 B2 | 9/2008 | Dupuis |
| 7,447,492 B2 | 11/2008 | Dupuis |
| 7,449,987 B2 | 11/2008 | Snyder |
| 7,456,722 B1 | 11/2008 | Eaton et al. |
| 7,460,604 B2 | 12/2008 | Dupuis |
| 7,489,526 B2 | 2/2009 | Chen et al. |
| 7,545,059 B2 | 6/2009 | Chen et al. |
| 7,548,440 B2 | 6/2009 | Chen et al. |
| 7,558,080 B2 | 7/2009 | Chen et al. |
| 7,558,083 B2 | 7/2009 | Schlecht |
| 7,577,223 B2 | 8/2009 | Alfano et al. |
| 7,613,016 B2 | 11/2009 | Chen et al. |
| 7,663,896 B2 | 2/2010 | Na |
| 7,683,654 B2 | 3/2010 | Chen et al. |
| 7,692,444 B2 | 4/2010 | Chen et al. |
| 7,706,154 B2 | 4/2010 | Chen et al. |
| 7,719,305 B2 | 5/2010 | Chen |
| 7,788,608 B2 | 8/2010 | Huynh et al. |
| 7,859,085 B2 | 12/2010 | Pagaila et al. |
| 7,876,188 B2 | 1/2011 | Tarng et al. |
| 7,920,010 B2 | 4/2011 | Chen, Jr. et al. |
| 7,978,041 B2 | 7/2011 | Bertilsson |
| 7,983,059 B2 | 7/2011 | Chen |
| 8,084,894 B2 | 12/2011 | Chen |
| 8,089,311 B2 | 1/2012 | Chen |
| 8,558,344 B2 | 10/2013 | Chen |
| 8,736,343 B2 | 5/2014 | Chen et al. |
| 2003/0042571 A1 | 3/2003 | Chen et al. |
| 2003/0052712 A1 | 3/2003 | Comer |
| 2003/0075990 A1 | 4/2003 | Guitton et al. |
| 2003/0234436 A1 | 12/2003 | Hsu et al. |
| 2004/0070481 A1 | 4/2004 | Patel et al. |
| 2004/0184289 A1 | 9/2004 | Vinciarelli |
| 2005/0088269 A1 | 4/2005 | Hatano |
| 2005/0269657 A1 | 12/2005 | Dupuis |
| 2005/0271148 A1 | 12/2005 | Dupuis |
| 2005/0271149 A1 | 12/2005 | Dupuis |
| 2005/0272378 A1 | 12/2005 | Dupuis |
| 2005/0288739 A1 | 12/2005 | Hassler et al. |
| 2006/0023476 A1 | 2/2006 | Fosler |
| 2006/0039169 A1 | 2/2006 | Chen et al. |
| 2006/0039224 A1 | 2/2006 | Lotfi et al. |
| 2006/0120115 A1 | 6/2006 | Chen et al. |
| 2007/0052399 A1 | 3/2007 | Chen et al. |
| 2007/0052514 A1 | 3/2007 | Chen et al. |
| 2007/0133144 A1 | 6/2007 | Lewis |
| 2007/0153554 A1 | 7/2007 | Matsumoto |
| 2007/0258513 A1 | 11/2007 | Strzalkowski |
| 2008/0013635 A1 | 1/2008 | Dupuis |
| 2008/0025450 A1 | 1/2008 | Alfano et al. |
| 2008/0031286 A1 | 2/2008 | Alfano et al. |
| 2008/0094046 A1 | 4/2008 | Chen et al. |
| 2008/0119142 A1 | 5/2008 | Dupuis |
| 2008/0180206 A1 | 7/2008 | Fouquet et al. |
| 2008/0181316 A1 | 7/2008 | Crawley et al. |
| 2008/0192509 A1* | 8/2008 | Dhuyvetter ....... H02M 3/33523 363/17 |
| 2008/0231383 A1 | 9/2008 | Chang et al. |
| 2008/0238601 A1 | 10/2008 | Das et al. |
| 2008/0246450 A1 | 10/2008 | Matyas et al. |
| 2008/0260050 A1 | 10/2008 | Dupuis |
| 2008/0267301 A1 | 10/2008 | Alfano et al. |
| 2008/0317106 A1 | 12/2008 | Leung et al. |
| 2009/0017773 A1 | 1/2009 | Dupuis et al. |
| 2009/0021968 A1 | 1/2009 | Komatsu et al. |
| 2009/0027243 A1 | 1/2009 | Leung et al. |
| 2009/0091414 A1 | 4/2009 | Hopper et al. |
| 2009/0179491 A1 | 7/2009 | Ferguson et al. |
| 2009/0184754 A1 | 7/2009 | Chen |
| 2009/0184774 A1 | 7/2009 | Deng et al. |
| 2009/0195082 A1 | 8/2009 | Chen |
| 2009/0213914 A1 | 8/2009 | Dong et al. |
| 2009/0243028 A1 | 10/2009 | Dong et al. |
| 2010/0046252 A1 | 2/2010 | Keller |
| 2010/0072570 A1 | 3/2010 | Pagaila et al. |
| 2010/0157629 A1 | 6/2010 | Yoshikawa |
| 2010/0157631 A1 | 6/2010 | Lim et al. |
| 2011/0255208 A1 | 10/2011 | Petruska et al. |
| 2011/0286243 A1 | 11/2011 | Hsu et al. |
| 2012/0099345 A1 | 4/2012 | Zhao et al. |

FOREIGN PATENT DOCUMENTS

| | | |
|---|---|---|
| DE | 3836805 A1 | 5/1989 |
| DE | 19718420 A1 | 11/1998 |
| DE | 19922129 C1 | 9/2000 |
| DE | 19922123 A1 | 11/2000 |
| DE | 19922127 A1 | 11/2000 |
| DE | 19922128 C1 | 1/2001 |
| DE | 10100282 A1 | 7/2002 |
| EP | 0282102 A2 | 9/1988 |
| EP | 0307345 A1 | 3/1989 |
| EP | 0586062 A1 | 3/1994 |
| EP | 0708529 A2 | 4/1996 |
| EP | 0714131 A1 | 5/1996 |
| EP | 0917309 A2 | 5/1999 |
| EP | 0977406 A1 | 2/2000 |
| EP | 1171980 A1 | 1/2002 |
| EP | 1209791 A2 | 5/2002 |
| FR | 2679670 A1 | 1/1993 |
| GB | 1248209 A | 9/1971 |
| GB | 2173956 A | 10/1986 |
| JP | S57132460 A | 8/1982 |
| JP | S58215833 A | 12/1983 |
| JP | H07115768 A | 5/1995 |
| JP | H09037558 A | 2/1997 |
| JP | H10191654 A | 7/1998 |
| JP | 2002508916 A | 3/2002 |
| JP | 2002262545 A | 9/2002 |
| WO | WO-9520768 A1 | 8/1995 |
| WO | WO-9714170 A1 | 4/1997 |
| WO | WO-9837672 A1 | 8/1998 |
| WO | WO-9848541 A2 | 10/1998 |
| WO | WO-9921332 A1 | 4/1999 |
| WO | WO-0128094 A1 | 4/2001 |
| WO | WO-0161951 A1 | 8/2001 |
| WO | WO-02073914 A1 | 9/2002 |
| WO | WO-02086969 A2 | 10/2002 |
| WO | WO-200586062 A2 | 9/2005 |
| WO | WO-2007049898 A1 | 5/2007 |
| WO | WO-2008040179 A1 | 4/2008 |
| WO | WO-2008114073 A1 | 9/2008 |

OTHER PUBLICATIONS

"IEEE Standard for a High Performance Serial Bus", IEEE Std 1394-1995, Microprocessor and Microcomputer Standards Committee, 1996, pp. i-viii, pp. 1-384.

Akiyama et al., "A High-Voltage Monolithic Isolator for a Communication Network Interface," IEEE Transactions on Electron Devices, vol. 49, No. 5, May 2002, pp. 895-901.

All About Circuits, "An Electric Pendulum", Textbook, vol. II—Alternating Circuit (AC), Chapter 6: Resonance, allaboutcircuits.com, Jul. 12, 2004, 5 pages.

Analog Devices, "Frequently Asked Questions: Isolation, iCoupler Technology, and iCoupler Products", Mar. 2006, 10 pages.

Analog Devices, "High Precision, Low Offset, mV Input Isolation Amplifier", AD208 datasheet, 16 pages.

Analog Devices, "High Speed Digital Isolators", ADuM1100AR / ADuM1100BR datasheet, Rev. 0, 2001, 12 pages.

Analog Devices, "High Speed, Logic Isolator With Power Transformer", AD260 datasheet, Rev. 0, Sep. 1998, 8 pages.

Analog Devices, "iCoupler Digital Isolation Products", 2005, 12 pages.

Analog Devices, "Low Cost, Miniature Isolation Amplifiers", AD202 / AD204 datasheet, Rev. B, 1994, 12 pages.

Analog Devices, "Precision, Wide Bandwidth 3-Port Isolation Amplifier", AD210 datasheet, Rev. A, 8 pages.

(56) References Cited

OTHER PUBLICATIONS

Analog Devices, "Rugged, Military Temperature Range, 10 kHz Bandwidth Isolation Amplifier", AD203SN datasheet, Rev. A, 12 pages.
Avago Technologies, "Dual-Channel High Speed 15 MBd CMOS Optocoupler", QCPL-073H datasheet, Jul. 2007, 10 pages.
Avago Technologies, "Single-Channel High Speed 15 MBd CMOS Optocoupler" QCPL-070H datasheet, Jul. 2007, 10 pages.
Banerjee and Kliger, "Micromachined Magnetics: a New Step in the Evolution of Isolation Technology", Electronic Engineering, Jun. 2000, pp. 27-32.
Baumann, "Free-Running Bridge Inverter", IBM Technical Disclosure Bulletin, vol. 9, No. 10, Mar. 1967, p. 1462.
Bourgeois, "PCB Based Transformer for Power MOSFET Drive", IEEE, 1994, pp. 238-244.
Burr-Brown, "Dual, Isolated, Bi-Directional Digital Coupler", ISO150 datasheet, 3 versions, 1993-2007, 38 pages.
Business Wire, "Emerson Selects Analog Devices' Digital Isolation Technology for Industrial Systems; ADI's iCoupler Technology Enables Low-Cost Signal Isolation in High-Temperature Environments", Sep. 24, 2003, 2 pages.
Business Wire, "Pulse's New Miniature Transformers are Optimized for Wideband RF Applications", Jul. 26, 2000, 2 pages
Chen et al., "High Speed Digital Isolators Using Microscale On-Chip Transformers", Elektronik, Jul. 22, 2003, English version, 6 pages.
Chiu et al., "Thin-Film Inductive Heads", IBM J. Res. Develop., vol. 40, No. 3, May 1996, pp. 283-300.
Christiansen, "Pulse-Code Modulation (PCM)", Electronics Engineers' Handbook, Fourth Edition, McGraw-Hill, Inc., 1996, 3 pages (unnumbered).
Chu et al., "High-Voltage CMOS Decoder/Driver for Plasma Displays", 1976 IEEE International Solid-State Circuits Conference (ISSCC 76), Digest of Technical Papers, vol. XIX, Feb. 1976, pp. 212-213.
Dotter et al., "Implementation of an Adaptive Balancing Hybrid", IEEE Transactions on Communications, vol. 28, No. 8, Aug. 1980, pp. 1408-1416.
EDN Network, "Welcome to the 17th Annual EDN Innovation Awards: EDN's 2006 Innovation Awards Nominees—Nominee Detail—ADuM125xI2C Digital Isolators (Analog Devices)", Reed Business Information, 2007, 2 pages.
EE Times Asia, "ADI Digital Isolators Reduce Per-Channel Costs", New Products, Jun. 19, 2003, 1 page.
EE Times Online, "EE Times Names ACE Finalists", Latest News, Jan. 15, 2007, 3 pages.
El-Hammanmsy, "Design of High-Efficiency RF Class-D Power Amplifier", IEEE Transactions on Power Electronics, vol. 9, No. 3, May 1994, pp. 297-308.
Fleming, "Isolation Amplifiers Break Ground Loops and Achieve High CMRR", EDN, vol. 32, No. 26, Dec. 24, 1987, pp. 97-102, and p. 5.
Gallo et al., "An Unity High Power Factor Power Supply Rectifier Using a PWM AC/DC Full Bridge Soft-Switching", 17th Annual IEEE Applied Power Electronics Conference and Exposition (APEC 2002), Mar. 2002, pp. 1190-1194.
Geen et al., "Miniature Multilayer Spiral Inductors for GaAs MMICs", 11th Annual IEEE Gallium Arsenide Integrated Circuit (GaAs IC) Symposium, Oct. 22-25, 1989, Technical Digest, pp. 303-306.
Ghiorse and Ranta, "Isolation in Medical Applications", Power Electronics Europe, Jul. 2005, 2 pages.
Greenhouse, "Design of Planar Rectangular Microelectronic Inductors", IEEE Transactions on Parts, Hybrids, and Packaging, vol. 10, No. 2, Jun. 1974, pp. 101-109.
Hermann et al., "Magnetically Coupled Linear Isolator", IEEE Transactions on Magnetics, vol. 33, No. 5, Sep. 1997, pp. 4029-4031.
Hewlett Packard, "40 ns Prop. Delay, SO-8 Optocoupler", HCPL-0710 Technical Data, 16 pages.
Irvine, "Early Digital Computers at Bell Telephone Laboratories", IEEE Annals of the History of Computing, Jul.-Sep. 2001, pp. 22-42.
Jaycar Electronics, "DC-DC Converters: A Primer", DCDCONV Reference Data Sheet, 2001, 5 pages.
Kehrer, "Design of Monolithic Integrated Lumped Transformers in Silicon-based Technologies up to 20 GHz", Master's thesis, Technical University of Vienna, Institute of Communications and Radio-Frequency Engineering, Dec. 2000, 85 pages.
Kester, "Digital Isolation Techniques", Practical Design Techniques for Sensor Signal Conditioning, Section 10: Hardware Design Techniques, Analog Devices, Inc., 1999, pp. 10.55-10.57.
Kester, "Origins of Real-World Signals and Their Units of Measurement", Mixed Signal and DSP Design Techniques, Section 1: Introduction, Newnes, 2003, pp. 1.1-1.10.
Kliger et al., "Isolation with Waferscale Transformers", Digital Isolation, Power Electronics Europe, Issue 6, 2005, pp. 40-43.
Knoedl, Jr., et al., "A Monolithic Signal Isolator", 4th Annual IEEE Applied Power Electronics Conference and Exposition (APEC '89), Mar. 13-17, 1989, Conference Proceedings, pp. 165-170.
Kojima et al., "2.3 kVac 100 MHz Multi-Channel Monolithic Isolator IC," 12th International Symposium on Power Semiconductor Devices and ICs (ISPSD'2000), May 2000, pp. 309-312.
Kojima et al., "A Novel Monolithic Isolator for a Communications Network Interface IC", 11th Annual IEEE International ASIC Conference, Sep. 1998, pp. 255-258.
Kuhn et al., "An RF-Based IEEE 1394 Ground Isolator Designed in a Silicon-on-Insulator Process", 44th IEEE Midwest Symposium on Circuits and Systems (MWSCAS 2001), Aug. 2001, pp. 764-767.
Lam et al., "High-Isolation Bonding Pad Design for Silicon RFIC up to 20 GHz", IEEE Electron Device Letters, vol. 24, No. 9, Sep. 2003, pp. 601-603.
Laughton et al., "Digital Control Systems", Electrical Engineer's Reference Book, Sixteenth Edition, Chapter 14, Newnes, 2003, 3 cover sheets (unnumbered), pp. 14/6-14/9.
Lazarczyk et al., "Comparison of Fields Emitted from High Frequency Silicon-Integrated, Microfabricated Inductors," 13th European Conference on Power Electronics and Applications, EPE '09, Sep. 8-10, 2009.
Ledwich, "DC-DC Converter Basics", Power Designers, 1998, www.powerdesigners.com, 11 pages.
Long et al., "A 1.9 GHz Low-Voltage Silicon Bipolar Receiver Front-End for Wireless Personal Communications Systems", IEEE Journal of Solid-State Circuits, vol. 30, No. 12, Dec. 1995, pp. 1438-1448.
Moss et al., "Integrated Circuit D-MOS Telephone Crosspoint Array," 1976 IEEE International Solid-State Circuits Conference (ISSCC 76), Digest of Technical Papers, vol. XIX, Feb. 1976, pp. 32-33, 226.
National Instruments, "Isolation Technologies for Reliable Industrial Measurements", Whitepaper, 2006, 11 pages.
National Instruments, "Technologies behind NI Industrial M and S Series Data Acquisition Devices with Isolation", NI Developer Zone, Oct. 3, 2007, 5 pages.
Ng et al., "Optimized Geometrical Features of Monolithic Spiral RF Transformers on Silicon", SAFE ProRISC SeSens 2001, Conference Proceedings, Nov. 2001, pp. 132-135.
Nihtianov, "Magnetogalvanic Approach to Isolation of Analog Circuits", IEEE Transactions on Instrumentation and Measurement, vol. 43, No. 4, Aug. 1994, pp. 677-680.
Niknejad et al., "Analysis, Design, and Optimization of Spiral Inductors and Transformers for Si RF ICs", IEEE Journal of Solid-State Circuits, vol. 33, No. 10, Oct. 1998, pp. 1470-1481.
NVE Corporation, "High Speed Digital Coupler", IL710 datasheet, Jul. 2002, 8 pages.
NVE Corporation, "High Speed Five-Channel Digital Isolators", IL260/IL261 datasheet, Rev. E, Apr. 2007, 11 pages.
Park et al., "Packaging Compatible Microtransformers on a Silicon Substrate", IEEE Transactions on Advanced Packaging, vol. 26, No. 2, May 2003, pp. 160-164.
Pickering, "A System Designer's Guide to Isolation Devices", Sensors, Jan. 1999, pp. 14-26 (7 pages).
PICO Electronics, "Audio Transformers: 2 Ohm to 40K Ohm; 400 Hz to 100 KHz, 400 miliwatt at 1KHz", datasheet, 8 pages.
PowerZONE, "ADuM1300/01/1400/01/02: Multi-Channel Digital Isolators for High-Voltage Industrial Applications", powerZONE Products for the week of May 26, 2003, 2 pages.

(56) References Cited

OTHER PUBLICATIONS

PR Newswire, "Electronics Technology Elite Compete for Industry's Highest Honors as EE Times Announces Finalists for 2007 EE Times ACE Awards", Jan. 15, 2007, 5 pages.
Premier Devices, "Surface Mount Transformer", XFA-0401-1U datasheet, 1 page.
Pulse Engineering, "RF Transformers, Transformers for Wideband RF Applications", C244.A datasheet, Oct. 2004, 2 pages.
Ronkainen et al., "IC Compatible Planar Inductors on Silicon", IEE Proceedings—Circuits Devices Systems, vol. 144, No. 1, Feb. 1997, pp. 29-35.
Roth, Jr., "Clocked Flip-Flops with Clear and Preset Inputs", Fundamentals of Logic Design, Third Edition, 1985, 2 Cover Sheets (unnumbered), pp. 254-256.
Roth, Jr., "MOS and CMOS Logic", Fundamentals of Logic Design, Third Edition, 1985, 2 Cover Sheets (unnumbered), pp. 613-616.
Sayani et al., "Isolated Feedback for Off-Line Switching Power Supplies with Primary-Side Control", 3rd Annual IEEE Applied Power Electronics Conference and Exposition (APEC '88), Feb. 1988, pp. 203-211 (5 pages).
Shin et al., "A 250-Mbit/s CMOS Crosspoint Switch", IEEE Journal of Solid-State Circuits, vol. 24, No. 2, Apr. 1989, pp. 478-486.
Silicon Laboratories, "Global Line-Side DAA for Embedded System-Side Module," Si306x datasheet, Rev. 0.9, Jan. 2005, 62 pages.
Silicon Laboratories, "Highlights of the Si844x Quad Digital Isolators", date unknown, 1 page.
Silicon Laboratories, "Quad-Channel Digital Isolator", Si8440/41/42/45 datasheet, Rev. 0.6, Aug. 2007, 30 pages.
Silicon Laboratories, "Silicon Laboratories Announces Industry's Fastest, Most Integrated Four Channel Digital Isolators", News Release, Mar. 20, 2006, 3 pages.
Silicon Laboratories, "Triple-Channel Digital Isolator", Si8430/31/35 datasheet, Rev. 0.3, Aug. 2007, 30 pages.
Simburger et al., "A Monolithic Transformer Coupled 5-W Silicon Power Amplifier with 59% PAE at 0.9 GHz", IEEE Journal of Solid-State Circuits, vol. 34, No. 12, Dec. 1999, pp. 1881-1892.
Small, "Medical Devices Demand Stringent Isolation Techniques", EDN, Sep. 28, 2006, pp. 41-49.
Standard Handbook for Electrical Engineers, "Carrier Communication, Tone Multiplex Equipment", Tenth Edition, McGraw-Hill, 1968, 2 Cover Sheets (unnumbered), pp. 15-75 and 15-84, 15-85.
Streetman, "Monolithic Device Elements", Solid State Electronic Devices, Second Edition, Prentice-Hall, 1980, 2 Cover Sheets (unnumbered), pp. 346-347.
Streetman, "Semiconductor Materials" and "Monolithic Device Elements", Solid State Electronic Devices, Third Edition, Prentice Hall, 1990, pp. 1-2 and p. 355.
Sze, "Physics and Properties of Semiconductors—A Resume", Physics of Semiconductor Devices, Second Edition, John Wiley & Sons, 1981, 2 Cover Sheets (unnumbered), and p. 7.
Tabisz et al., "Zero-Voltage-Switched Quasi-Resonant Buck and Flyback Converters—Experimental Results at 10MHz", IEEE Transactions on Power Electronics, vol. 4, No. 2, Apr. 1989, pp. 194-204.
Tang, et al., "A Low-Profile Low-Power Converter with Coreless PCB Isolation Transformer", IEEE Transactions on Power Electronics, vol. 16, No. 3, May 2001, pp. 311-315.
Tang, et al., "A Low-Profile Wide-Band Three-Port Isolation Amplifier with Coreless Printed-Circuit-Board (PCB) Transformers", IEEE Transactions on Industrial Electronics, vol. 48, No. 6, Dec. 2001, pp. 1180-1187.
Texas Instruments, "3.3-V / 5-V High-Speed Digital Isolators", ISO721 / ISO722 datasheet, Jan. 2006 (revised Feb. 2007), 24 pages.
Texas Instruments, "Dual Digital Isolators", ISO7220 / ISO7221 datasheet, Jul. 2006 (revised Aug. 2007), 25 pages.
Texas Instruments, "Quad Digital Isolators", ISO7240 / ISO7241 / ISO7242 datasheet, Sep. 2007 (revised Dec. 2007), 25 pages.
Tsang et al., "Design, Fabrication, and Performance of Spin-Valve Read Heads for Magnetic Recording Applications", IBM J. Res. Develop, vol. 42, No. 1, Jan. 1998, pp. 103-116.
Walker et al., "An Isolated MOSFET Gate Driver", Australasian Universities Power Engineering Conference (AUPEC '96), Oct. 1996, pp. 175-180.
Wang et al., "Embedded Integrated Inductors with a Single Layer Magnetic Core," Oral presentation, International Workshop on Power Supply on Chip, PwrSOC'08, Sep. 23, 2008.
Wedlock et al., "Capacitors", Electronic Components and Measurements, Prentice-Hall, 1969, 4 Cover Sheets (unnumbered), and p. 89.
Wolf, "Silicon Processing for the VLSI Era, vol. 2: Process Integration", Lattice Press, 1990, 2 Cover Sheets (unnumbered), pp. 66-69.
Wright et al., "Analysis of Integrated Solenoid Inductor With Closed Magnetic Core," IEEE Transactions on Magnetics, vol. 46, No. 6, pp. 2387-2390, Jun. 2010.
Zhou et al., "A Fully Integrated CMOS 900MHz LNA Utilizing Monolithic Transformers", IEEE International Conference on Solid-State Circuits, Feb. 5-7, 1998, Digest of Technical Papers, pp. 132-133.
Zhou et al., "Monolithic Transformers and Their Application in a Differential CMOS RF Low-Noise Amplifier", IEEE Journal of Solid State Circuits, vol. 33, No. 12, Dec. 1998, pp. 2020-2027.

\* cited by examiner

300

ISOLATED ERROR AMPLIFIER FOR ISOLATED POWER SUPPLIES

BACKGROUND

A power conversion system may include a feedback path that monitors and adjusts the output of the power supply apparatus to maintain the stability of the output. The feedback path may operate at low frequency ranges that may interfere with some high frequency device applications. Additionally, power conversion efficiency and power conservation are important considerations for power conversion systems.

Thus, there is a need for a power conversion system including an isolated error amplifier that increases power switching frequency while maintaining power conversion efficiency.

DETAILED DESCRIPTION

According to an exemplary embodiment of the present disclosure, a power converter may include an isolated error amplifier. The isolated error amplifier may include an amplifier that, based on an output signal of the power converter and a reference signal, may generate an error signal, a modulator that, based on the error signal, may generate a modulated error signal, an isolator that, based on the modulated error signal, may generate an isolated modulated error signal, and a demodulator that, based on the isolated modulated error signal, may generate an isolated error signal, which may be substantially proportional to the difference between the output signal and the reference signal. The power converter may further include a controller that, based on the isolated error signal, may control a power stage to generate the output signal of the power converter.

Figure 1:
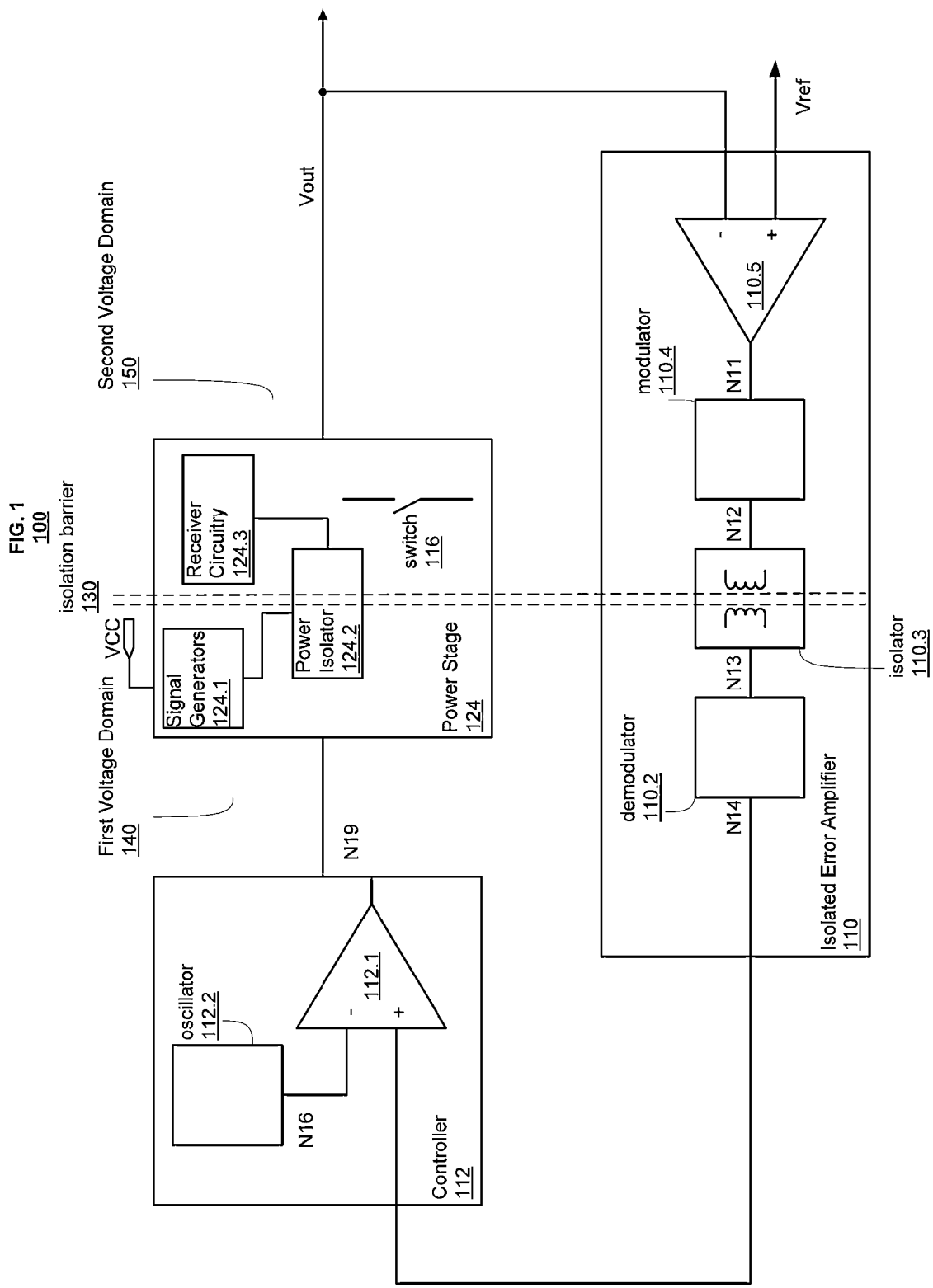
FIG. 1 illustrates a simplified block diagram of a power converter including an isolated error amplifier according to an embodiment of the present disclosure.

FIG. 1 illustrates a power converter 100 for an isolated circuit system according to an embodiment of the present invention. A power converter 100 may include an error amplifier 110, a controller 112 and a power stage 124.

Circuits of the power converter 100 may be distributed on either side of an isolation barrier 130, which maintains galvanic isolation between two different voltage domains 140, 150. Thus, circuit components on each side of the isolation barrier may have independent voltage supplies and ground planes from each other. Isolation devices, discussed herein, allow for signal and power transfer across the isolation barrier 130 while maintaining galvanic isolation between the two voltage domains 140, 150.

The power stage 124 delivers power across the isolation barrier 130 from the first voltage domain 140 to the second voltage domains 150. The power stage 124 may generate an output voltage VOUT, which may act as a voltage supply for other circuit components (not shown) in the second voltage domain 150. Typically, the power stage 124 includes signal generators 124.1 in the first voltage domain 140 that supply power generating signals to a power isolator 124.2. The power stage 124 may include power receiver circuitry 124.3 that receives signals from the power isolator 124.2 and generates the output voltage VOUT therefrom. The signal generator 124.1 may operate in accordance with a control signal supplied by the controller 112.

The error amplifier 110 may include a demodulator 110.2, an isolator 110.3, a modulator 110.4 and an amplifier 110.5. The amplifier 110.5 may compare the output signal Vout from the power stage 124 to a reference signal Vref and may generate an error signal N11 therefrom. The modulator 110.4, based on the error signal N11, may generate a modulated error signal N12 and supply it to the isolator 110.3. The isolator 110.3 may transfer the modulated error signal N12 to the demodulator 110.2 that may generate an error signal N14 therefrom, which may be substantially proportional to the difference between the output signal Vout and the reference signal Vref.

The demodulator 110.2, the isolator 110.3, and the modulator 110.4 may be configured as a linear isolator. In a linear isolator configuration, the demodulator 110.2 and the modulator 110.4 may be matched or scaled to each other, such that the gain of the linear isolator may be independent of individual circuit element parameters such as resistors or capacitors in the demodulator 110.2 and the modulator 110.4, but dependent on the ratio of corresponding reference voltage levels and the ratio of corresponding component parameters on each side of the isolation barrier. As such, the demodulator 110.2 and the modulator 110.4 may not need to be matched or scaled for all of the portions of their respective circuit paths and elements, and only need to be matched or scaled for a selective few circuit elements to obtain an accurate pre-designated gain level for the linear isolator.

The modulator 110.4 may modulate via one of amplitude modulation, frequency modulation, pulse width modulation, and pulse density modulation. The demodulator 110.2 may demodulate via a protocol corresponding to the modulation in the modulator 110.4, for example, one of amplitude demodulation, frequency demodulation, pulse width demodulation, and pulse density demodulation. The error signal N11 may be modulated, for example, amplitude modulated (AM), frequency modulated (FM), pulse-width modulated (PWM), or pulse-density modulated (PDM). The modulated error signal N12 may be transmitted across the isolation barrier via an isolator 110.3, for example a digital isolator.

The amplifier 110.5 may include a wide-band error amplifier connected on the second voltage domain 150 to the output side of the power stage 124. The amplifier 110.5 may be connected to the output side of the power stage 124 via a compensation network, (not shown), which may be located on separate integrated chips ("IC") than the amplifier 110.5.

The isolator 110.3 may couple an error signal N11, which may be an analog signal, from the secondary side across an isolation barrier to the primary side or the input side of a power stage 124.

In one embodiment, the isolator 110.3 may be a microtransformer. The isolator 110.3 may include a primary coil receiving the modulated error signal N12 and a secondary coil generating the isolated modulated error signal N13. The primary coil may be coupled to the secondary coil in an induction coupling configuration. The isolator 110.3 may have superior tolerance for environmental factors, if the modulated error signal N12 at the input and the isolated modulated error signal N13 were digital signals, such as signals with PWM or PDM.

In other embodiments, the isolator 110.3 may be a capacitive or magneto-resistive/giant magneto-resistive isolator.

The error amplifier 110 may generate the reference signal Vref at a predetermined voltage level corresponding to a desired output signal. The reference voltage source may be a bandgap source or other appropriate local voltage source.

The controller 112 may include an oscillator 112.2 and an error comparator 112.1.

Based on the error signal N14 from the error amplifier 110, the controller 112 may generate a control signal to the power stage 124 that adjusts the output voltage Vout generated in the second voltage domain 150. The error comparator 112.1 may control the power stage 124 based on the error signal N14. The controller 112 may control the power stage 124 via a control signal N19, generated from the error comparator 112.1, having one of pulse width modulation and pulse density modulation. The oscillator 112.2 may generate a waveform N16 with a predetermined period or frequency.

According to an embodiment, the waveform N16 from the oscillator 112.2 may be a triangular sawtooth waveform. The error comparator 112.1 may compare the waveform N16 and the error signal N14 to generate the control signal N19. That is, if the waveform N16 is less than the error signal N14, the error comparator 112.1 may output a "high" signal on control signal N19. Otherwise, the error comparator 112.1 may output a "low" signal on control signal N19. Because the waveform N16 is compared with the varying signal of the error signal N14 to generate the control signal N19, the control signal N19 may be pulse width modulated according to the level of the error signal N14.

The power stage 124 may receive the control signal N19 to control the output signal Vout. The power stage 124 may be connected to a power supply VCC, and may include a switch 116, controlled based on the control signal N19 to control the output signal Vout.

The error amplifier 110, the controller 112 and the power stage 124 may be separately or jointly integrated on IC. For example, the error amplifier 110, the controller 112 and the power stage 124 may be on one IC, two IC or three IC configurations. In a one IC configuration, the error amplifier 110, the controller 112 and the power stage 124 may be integrated on a single IC. In a two IC configuration, for example, the first voltage domain 140 side of the error amplifier 110, the first voltage domain 140 side of the power stage 124, and the controller 112 may be integrated on a first IC; the second voltage domain 150 side of the power stage 124 and the second voltage domain 150 side of the error amplifier 110 may be integrated on a second IC; the isolator 130 may be implemented on either the first or the second IC. In a three IC configuration, for example, the first voltage domain 140 components may be integrated on a first IC; the second voltage domain 150 components may be integrated on a second IC; the isolator 130 may be implemented on a third IC.

Figure 2:
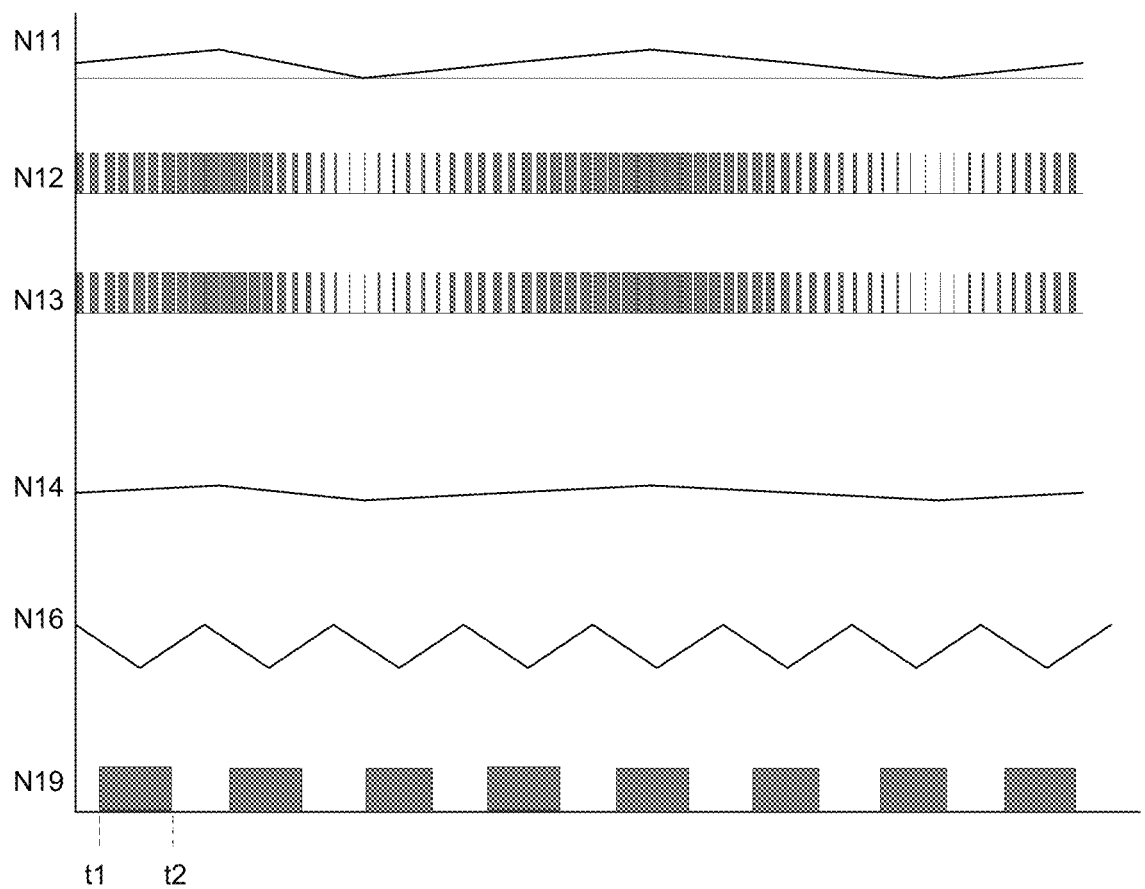
FIG. 2 illustrates simulated signals in the power converter according to an embodiment of the present disclosure.

FIG. 2 illustrates exemplary signals that may find application in a power converter 100 according to an embodiment of the present invention. The amplifier 110.5 may generate the error signal N11, representing the difference between Vout and Vref. The modulator 110.4 may generate a modulated error signal N12, which in this example may be a pulse width modulated waveform. The isolator 110.3 may receive the modulated error signal N12, and may generate an isolated modulated error signal N13, which may be also pulse width modulated. The demodulator 110.2 may demodulate the isolated modulated error signal N13, and may generate an error signal N14. The demodulator 110.2 may also filter and remove noise, such as ripples and spikes, in the isolated modulated error signal N13. The error signal N14 may be similar to the error signal N11, and thus substantially proportional to the difference between the output signal Vout and the reference signal Vref. Thus, the error amplifier 110 transmits and isolates the error signal N11 from the secondary side of the power converter 100 to the primary side of the power converter 100, with little or no noise to obtain a clean feedback signal in the error signal N11, in order to allow the power converter 100 to effectively monitor and control the output signal Vout.

In the controller 112, the oscillator 112.2 may generate the waveform N16, which may be a triangular sawtooth waveform. The error comparator 112.1 may compare the waveform N16 and the error signal N14 to generate the control signal N19. For example, at time "t1," the waveform N16 may be less than the error signal N14, the error comparator 112.1 may output a "high" signal on control signal N19. Later, at time "t2", the waveform N16 may be greater than the error signal N14, the error comparator 112.1 may output a "low" signal on control signal N19. Because the waveform N16 is compared with the varying signal of the error signal N14 to generate the control signal N19, the control signal N19 may be pulse width modulated according to the level of the error signal N14. That is, when the error signal N15 is relatively high in magnitude for longer periods of time, then correspondingly, the control signal N19 may have a wider pulse width, the time between t1 and t2. The error comparator 112.1 may generate similar pulses continuously in the control signal N19 to control the power stage 124.

Figure 3:
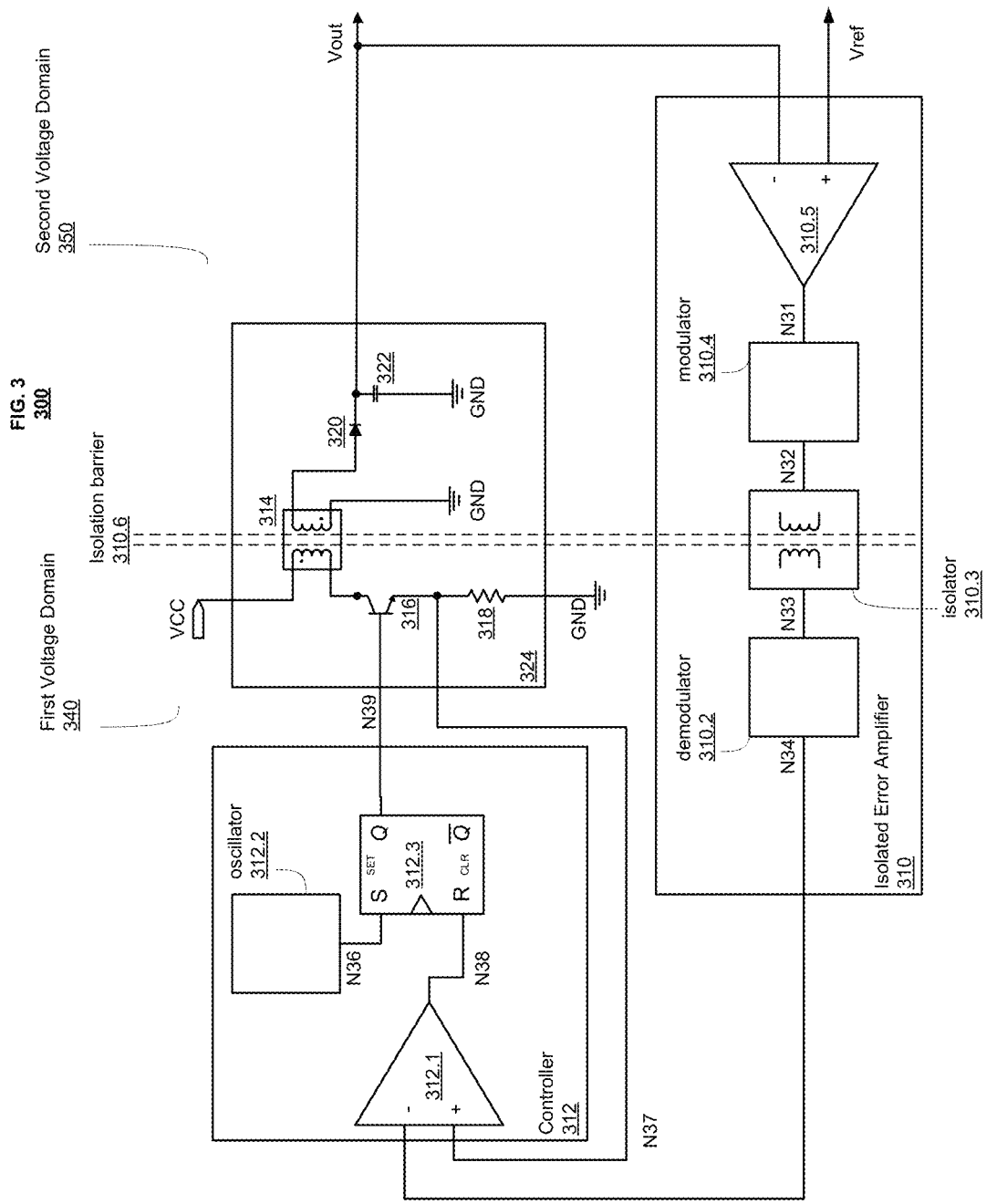
FIG. 3 illustrates a simplified block diagram of a power converter including an isolated error amplifier according to an embodiment of the present disclosure.

FIG. 3 illustrates a power converter 300 according to an embodiment of the present disclosure. A power converter 300 may include an error amplifier 310, a controller 312, and a power stage 324.

Circuits of the power converter 300 may be distributed on either side of an isolation barrier 330, which maintains galvanic isolation between two different voltage domains 340, 350. Thus, circuit components on each side of the isolation barrier may have independent voltage supplies and ground planes from each other. Isolation devices, discussed herein, allow for signal and power transfer across the isolation barrier 310.6 while maintaining galvanic isolation between the two voltage domains 340, 350.

The power stage 324 delivers power across the isolation barrier 330 from the first voltage domain 340 to the second voltage domains 350. The power stage 324 may generate an output voltage VOUT, which may act as a voltage supply for other circuit components (not shown) in the second voltage domain 350. Typically, the power stage 324 may receive the control signal N39 to control the output signal Vout. The power stage 324 may be connected to a power supply VCC, and may include a switch 316, controlled based on the control signal N39 to control the output signal Vout. The power stage 324 may include a transformer 314 connecting on one side the power supply VCC to the switch 316, which is connected to ground GND via a resistor 318. The transformer 314 may be connected on the other side to the output signal Vout via a diode 320. The output signal Vout may be stored by a capacitor 322, which may be connected to ground GND. The switch 316 and the resistor 318 may generate the current signal N37 to feedback to the controller 312. The additional feedback loop of the current signal N37 back to the controller 312 allows the controller 312 to have additional stability in controlling the power stage 324. The power stage 324 may include an isolated flyback converter, as illustrated by the configuration in FIG. 3.

The error amplifier 310 may include a demodulator 310.2, an isolator 310.3, a modulator 310.4 and an amplifier 310.5. The amplifier 310.5 may compare the output signal Vout from the power stage 324 to a reference signal Vref and may generate an error signal N31 therefrom. The modulator 310.4, based on the error signal N31, may generate a modulated error signal N32 and supply it to the isolator 310.3. The isolator 310.3 may transfer the modulated error signal N32 to the demodulator 310.2 that may generate an error signal N34 therefrom, which may be substantially proportional to the difference between the output signal Vout and the reference signal Vref.

The demodulator 310.2, the isolator 310.3, and the modulator 310.4 may be configured as a linear isolator. In a linear isolator configuration, the demodulator 310.2 and the modulator 310.4 may be matched or scaled to each other, such that the gain of the linear isolator may be independent of individual circuit element parameters such as resistors or capacitors in the demodulator 310.2 and the modulator 310.4, but dependent on the ratio of corresponding reference voltage levels and the ratio of corresponding component parameters on each side of the isolation barrier. As such, the demodulator 310.2 and the modulator 310.4 may not need to be matched or scaled for all of the portions of their respective circuit paths and elements, and only need to be matched or scaled for a selective few circuit elements to obtain an accurate pre-designated gain level for the linear isolator.

The modulator 310.4 may modulate via one of amplitude modulation, frequency modulation, pulse width modulation, and pulse density modulation. The demodulator 310.2 may demodulate via a protocol corresponding to the modulation in the modulator 310.4, for example, one of amplitude demodulation, frequency demodulation, pulse width demodulation, and pulse density demodulation. The error signal N31 may be modulated, for example, amplitude modulated (AM), frequency modulated (FM), pulse-width modulated (PWM), or pulse-density modulated (PDM). The modulated error signal N32 may be transmitted across the isolation barrier via an isolator 310.3, for example a digital isolator.

The amplifier 310.5 may include a wide-band error amplifier connected on the second voltage domain 350 to the output side of the power stage 324. The amplifier 310.5 may be connected to the output side of the power stage 324 via a compensation network, (not shown), which may be located on separate IC's than the amplifier 310.5.

The isolator 310.3 may couple an error signal N31, which may be an analog signal, from the secondary side across an isolation barrier to the primary side or the input side of a power stage 324.

In one embodiment, the isolator 310.3 may be a microtransformer. The isolator 310.3 may include a primary coil receiving the modulated error signal N32 and a secondary coil generating the isolated modulated error signal N33. The primary coil may be coupled to the secondary coil in an induction coupling configuration. The isolator 310.3 may have superior tolerance for environmental factors, if the modulated error signal N32 at the input and the isolated modulated error signal N33 were digital signals, such as signals with PWM or PDM.

In other embodiments, the isolator 310.3 may be a capacitive or magneto-resistive/giant magneto-resistive isolator.

The error amplifier 310 may generate the reference signal Vref at a predetermined voltage level corresponding to a desired output signal. The reference voltage source may be a bandgap source or other appropriate local voltage source.

The controller 312 may include an error comparator 312.1, an oscillator 312.2, and a logic 312.3.

Based on the error signal N34 from the error amplifier 310, the controller 312 may generate a control signal to the power stage 324 that adjusts the output voltage Vout generated in the second voltage domain 350. The error comparator 312.1 may control the power stage 324 based on the error signal N34. The controller 312 may control the power stage 324 via a control signal N39, generated from the error comparator 312.1, having one of pulse width modulation and pulse density modulation. The oscillator 312.2 may generate a waveform N36 with a predetermined period or frequency.

According to an embodiment, the error comparator 312.1 may control the power stage 324 based on the error signal N34 and a current signal N37 corresponding to the output signal Vout. The error comparator 312.1 may generate a reset signal N38. The controller 312 may control the power stage 324 via a control signal N39 having one of pulse width modulation and pulse density modulation. The oscillator 312.2 may generate a waveform N36 with a predetermined period or frequency. The logic 312.3 may include a S-R flip-flop that receives the waveform N36 and the reset signal N38. That is the logic 312.3 may turn on control signal N39 upon receiving a pulse in waveform N36 from the oscillator 312.2, and then may subsequently turn off the control signal N39 upon receiving a pulse in reset signal N38.

The error amplifier 310, the controller 312 and the power stage 324 may be separately or jointly integrated on integrated chips. For example, the error amplifier 310, the controller 312 and the power stage 324 may be on one IC, two IC or three IC configurations. In a one IC configuration, the error amplifier 310, the controller 312 and the power stage 324 may be integrated on a single IC. In a two IC configuration, for example, the first voltage domain 340 side of the error amplifier 310, the first voltage domain 340 side of the power stage 324, and the controller 312 may be integrated on a first IC; the second voltage domain 350 side of the power stage 324 and the second voltage domain 350 side of the error amplifier 310 may be integrated on a second IC; the isolator 330 may be implemented on either the first or the second IC. In a three IC configuration, for example, the first voltage domain 340 components may be integrated on a first IC; the second voltage domain 350 components may be integrated on a second IC; the isolator 330 may be implemented on a third IC.

Figure 4:
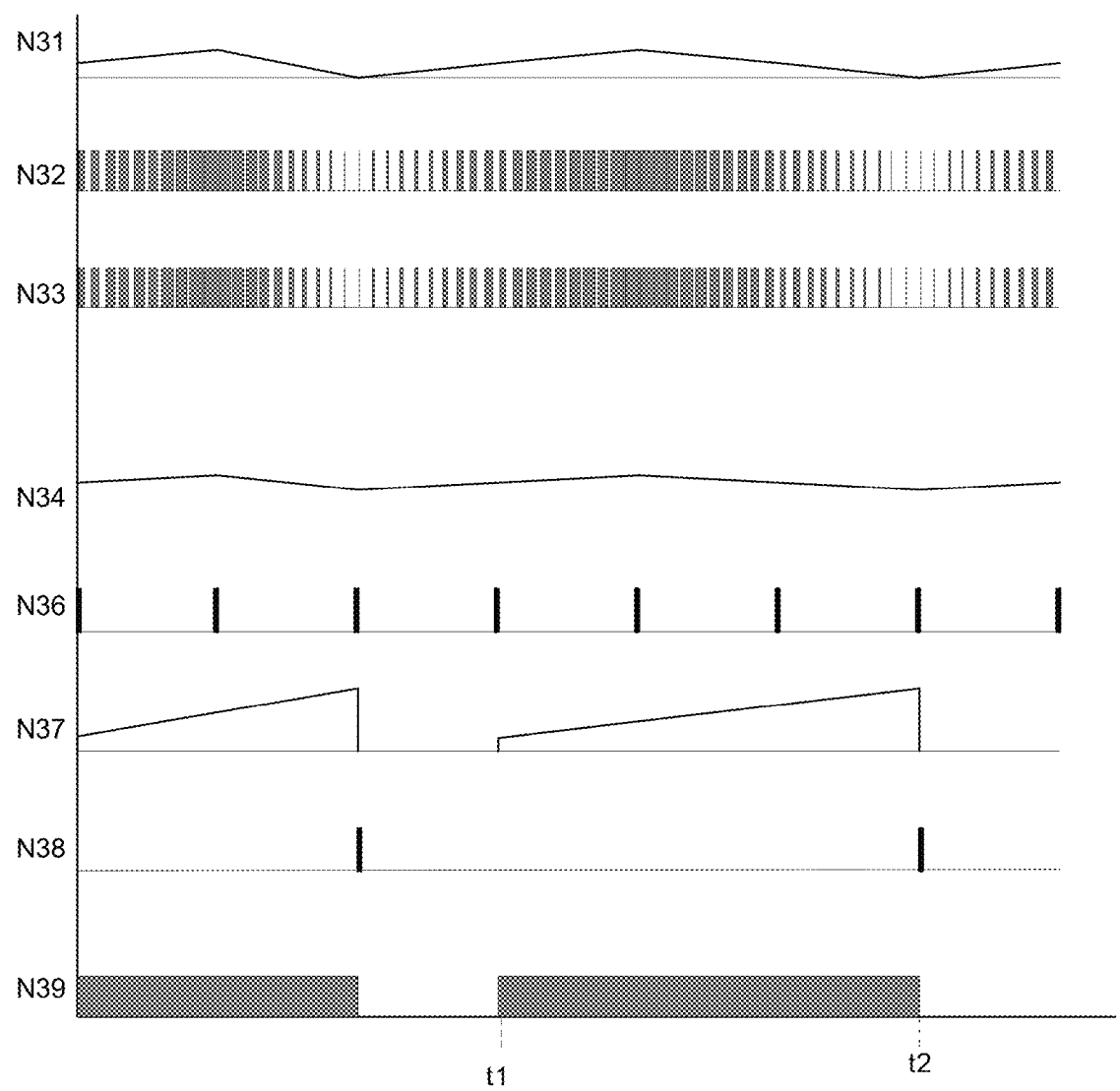
FIG. 4 illustrates simulated signals in the power converter according to an embodiment of the present disclosure.

FIG. 4 illustrates simulated signals in the power converter 300 according to an embodiment of the present disclosure. The amplifier 310.5 may generate the error signal N31, representing the difference between Vout and Vref. The modulator 310.4 may generate a modulated error signal N32, which may be a pulse width modulated waveform. The isolator 310.3 may receive the modulated error signal N32, and may generate an isolated modulated error signal N33, which may be also pulse width modulated. The demodulator 310.2 may demodulate the isolated modulated error signal N33, and may generate an error signal N34. The demodulator 310.2 may also filter and remove noise, such as ripples and spikes, in the isolated modulated error signal N33. The error signal N34 may be similar to the error signal N31, and thus substantially proportional to the difference between the output signal Vout and the reference signal Vref. Thus, the error amplifier 310 transmits and isolates the error signal N31 from the secondary side of the power converter 300 to the primary side of the power converter 300, with little or no noise to obtain a clean feedback signal in the error signal N31, in order to allow the power converter 300 to effectively monitor and control the output signal Vout.

In the controller 312, the oscillator 312.2 may generate the waveform N36, which may be a pulse waveform of a predetermined wavelength or frequency. The error comparator 312.1 may control the power stage 324 based on the error signal N34 and a current signal N37 corresponding to the output signal Vout. The current signal N37 may be a pulse with varying amplitude, representing the power stage 324 turning on and ramping current. The error comparator 312.2 may generate a reset signal N38, based on a comparison of the error signal N34 and the current signal N37. That is, when the current signal N37 rises to sufficiently high level compared to the error signal N34, a reset pulse is generated on the reset signal N38.

The logic 312.3 may include a S-R flip-flop that receives the waveform N36 and the reset signal N38. That is the logic 312.3 may turn on control signal N39 upon receiving a pulse in waveform N36 from the oscillator 312.2, and then may subsequently turn off the control signal N39 upon receiving a pulse in reset signal N38.

For example, immediately before time "t1," the error signal N34 may be sufficiently low, and the error comparator 312.1 may output a "low" signal on reset signal N38. At time "t1," the oscillator 312.2 outputs a pulse on waveform N36, which triggers logic 312.3 to set control signal N39 to a "high" level. The power stage 324 receives the high level on control signal N39, which turns on switch 316, causing current to ramp up through transformer 314 and resistor 318, and generating a pulse on current signal N37 with a ramping amplitude. When the current through resistor 318 is sufficiently high, at time "t2," thus the current signal N37 is sufficiently high in amplitude, the error comparator 312.1 is tripped and outputs a "high" signal on reset signal N38, causing the logic 312.3 to reset the control signal N39 to "low," which turns off the switch 316. The transformer 314, in attempting to maintain the same current, forces the current through the diode 320 to charge up the output signal Vout on capacitor 322. This increases the voltage on the output signal Vout, which may decrease the error signal N31.

Figure 5:
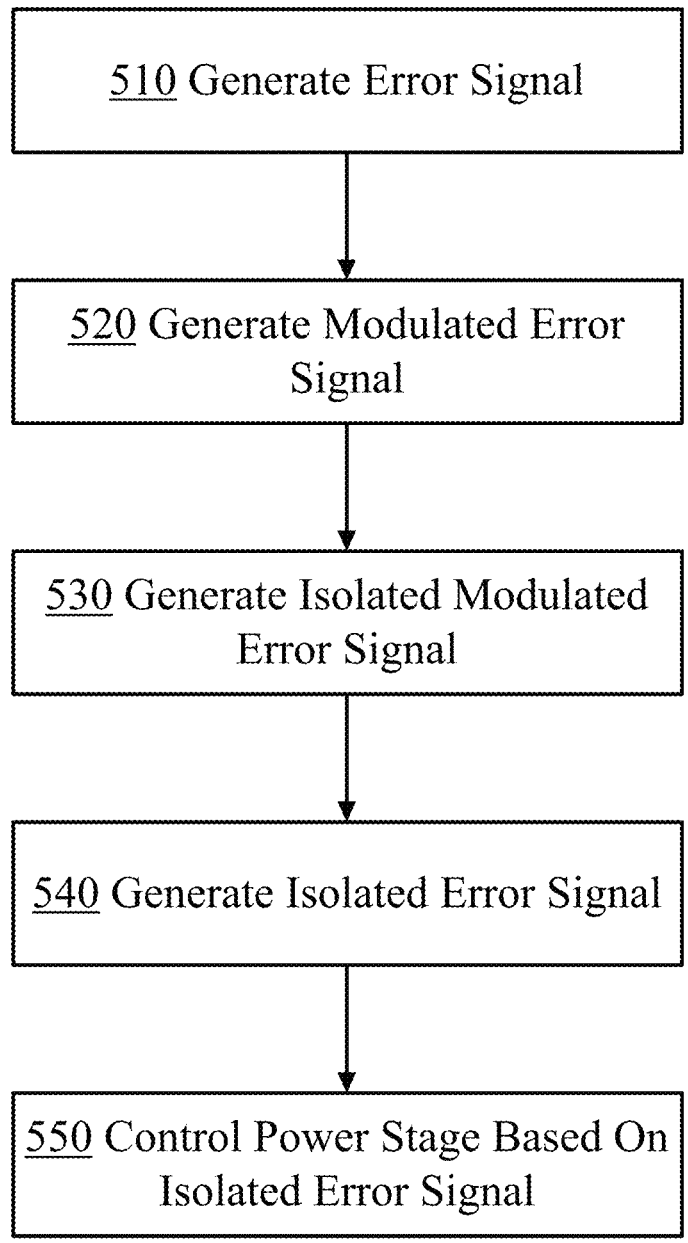
FIG. 5 illustrates an exemplary method according to an embodiment of the present disclosure.

FIG. 5 illustrates an exemplary method 500 according to an embodiment of the present disclosure. The method may include at block 510, generating, by an amplifier, an error signal based on an output signal of the power converter and a reference signal. At block 520, generating, by a modulator, a modulated error signal based on the error signal. At block 530, generating, by an isolator, an isolated modulated error signal based on the modulated error signal. At block 540, generating, by a demodulator, an isolated error signal based on the isolated modulated error signal. At block 550, controlling, by a controller, a power stage based on the isolated error signal, to generate the output signal of the power converter The pulse-width modulation in conjunction with digital isolator may provide accurate voltage transfer function of the linear isolator, which may be stable over lifetime and environmental changes. The high speed and wide bandwidth of the linear isolator may provide higher overall system bandwidth for the power converter, allowing for greater stability and faster feedback response. Thus, the power converter with simple and effective design is provided.

Figure 6:
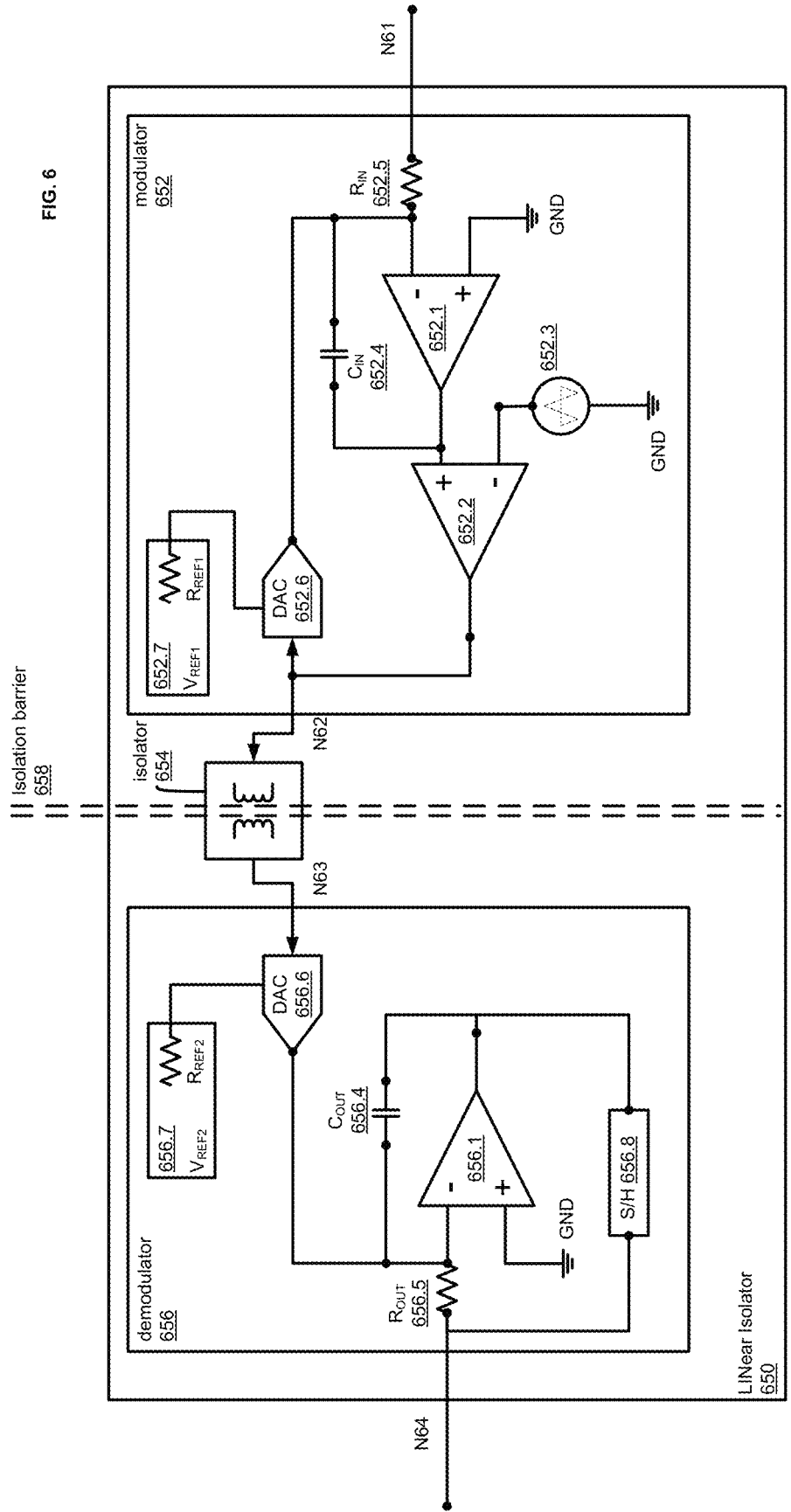
FIG. 6 illustrates an exemplary linear isolator according to an embodiment of the present disclosure.

FIG. 6 illustrates an exemplary linear isolator 650 according to an embodiment of the present disclosure. The linear isolator 650 may include a modulator 652, an isolator 654, and a demodulator 656.

The modulator 652 may receive an analog error signal N61 with voltage $V_{N61}$, to generate a digital modulated error signal N62. The isolator 654 may receive the digital modulated error signal N62 to generate a digital isolated error signal N63. The demodulator 656 may receive the digital isolated error signal N63 to generate an analog error signal N64 with voltage $V_{N64}$, across the isolation barrier 658. The linear isolator 650 may designed to have a gain, which is a ratio of the analog error signals N61 and N64.

The demodulator 656 and the modulator 652 may be matched or scaled to each other, such that the gain of the linear isolator may be independent of individual circuit element parameters such as resistors or capacitors in the demodulator 656 and the modulator 652, but dependent on the ratio of corresponding reference voltage levels and the ratio of corresponding component parameters on each side of the isolation barrier.

The modulator 652 may include an op-amp 652.1, a comparator 652.2, an oscillator 652.3, a capacitor 652.4 having capacitance $C_{IN}$, a resistor 652.5 having resistance $R_{IN}$, a digital-to-analog converter (DAC) 652.6, and a reference source 652.7. The demodulator 656 may include an op-amp 656.1, an oscillator 656.3, a capacitor 656.4 having capacitance $C_{OUT}$, a resistor 656.5 having resistance $R_{OUT}$, a DAC 656.6, a reference source 656.7, and a Sample-Hold (S/H) circuit 656.8.

In the modulator 652 and the demodulator 656, respective op-amps 652.1 and 656.1 may have capacitors and resistors in negative feedback signal paths.

The reference sources 652.7 and 656.7 may be voltage sources with respective voltage levels $V_{REF1}$ and $V_{REF2}$ and respective output resistances $R_{REF1}$ and $R_{REF2}$. The reference sources 652.7 and 656.7 may drive respective reference currents $V_{REF1}/R_{REF1}$ and $V_{REF2}/R_{REF2}$. The reference sources 652.7 and 656.7 may apply respective reference currents to respective DAC's 652.6 and 656.6 to convert digital input signals into analog signals, for example, by driving respective reference currents when receiving a "1" at respective digital inputs, and by driving the negative of respective reference currents when receiving a "0" at input. The DAC's 652.6 and 656.6 are driven based on the digital signals N62 and N63 having the same duty cycle, represented by D.

In the modulator 652, the input voltage $V_{N61}$ of signal N61 may be converted to current with another resistor $R_{IN}$. As the input current will equal to the feedback current, the duty cycle of the modulator will rely on the ratio of the two resistors $R_{REF1}/R_{IN}$, and the ratio of $V_{N61}/V_{REF1}$. The input current may be represented as:

$$\frac{V_{N61}}{R_{IN}} = D \times \frac{V_{REF1}}{R_{REF1}} + (1-D) \times \left(-\frac{V_{REF1}}{R_{REF1}}\right) \quad \text{(Equation 1)}$$

Duty cycle D then may be represented as:

$$D = \frac{V_{N61}}{2V_{REF1}} \frac{R_{REF1}}{R_{IN}} + \frac{1}{2} \quad \text{(Equation 2)}$$

The demodulator 656 may have the same duty cycle D. The output current in the demodulator 656 may be represented as:

$$\frac{V_{N64}}{R_{OUT}} = D \times \frac{V_{REF2}}{R_{REF2}} + (1-D) \times \left(-\frac{V_{REF2}}{R_{REF2}}\right) \quad \text{(Equation 3)}$$

Then, the gain of the linear isolator 650 may be represented as:

$$\text{Gain} = \frac{V_{N64}}{V_{N61}} = \frac{V_{REF2}}{V_{REF1}} \frac{R_{OUT}/R_{REF2}}{R_{IN}/R_{REF1}} \quad \text{(Equation 4)}$$

$R_{REF2}/R_{OUT}$ and $R_{REF1}/R_{IN}$ are resistor ratios in the modulator 652 and the demodulator 656, which may be manufactured with high precision even on separate IC dies. Additionally, reference voltage levels $V_{REF1}$ and $V_{REF2}$ may be generated to achieve ratio $V_{REF1}/V_{REF2}$ with high precision. As such, the demodulator 656 and the modulator 652 may not need to be matched or scaled for all of the portions of their respective circuit paths and elements, and only need to be matched or scaled for a selective few circuit elements, for example shown in Equation 4 above, to obtain an accurate pre-designated gain level for the linear isolator 650.

It is appreciated that the disclosure is not limited to the described embodiments, and that any number of scenarios and embodiments in which conflicting appointments exist may be resolved.

Although the disclosure has been described with reference to several exemplary embodiments, it is understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular means, materials and embodiments, the disclosure is not intended to be limited to the particulars disclosed; rather the disclosure extends to all functionally equivalent structures, methods, and uses such as are within the scope of the appended claims.

While the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof.

The present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "disclosure" merely for convenience and without intending to voluntarily limit the scope of this application to any particular disclosure or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

We claim:

1. A power converter, comprising:
   an amplifier, based on an output signal of the power converter and a reference signal, generating an analog error signal;
   a modulator, based on the analog error signal, generating a digital modulated error signal;
   an isolator, based on the digital modulated error signal, generating a digital isolated modulated error signal;
   a demodulator, based on the digital isolated modulated error signal, generating an analog isolated error signal; and a controller, based on the analog isolated error signal, controlling a power stage to generate the output signal of the power converter, wherein a gain in generating the analog isolated error signal from the analog error signal is set by a ratio between a first reference signal generated by the modulator and a second reference signal generated by the demodulator.

2. The power converter according to claim 1, wherein the isolator comprises a primary coil receiving the digital modulated error signal and a secondary coil generating the digital isolated modulated error signal.

3. The power converter according to claim 2, wherein the primary coil is coupled to the secondary coil in an induction coupling configuration.

4. The power converter according to claim 1, wherein the controller comprises an error comparator that controls the power stage based on the digital isolated error signal.

5. The power converter according to claim 1, wherein the controller controls the power stage via a control signal having one of pulse width modulation and pulse density modulation.

6. The power converter according to claim 1, wherein:
the modulator includes a first operational amplifier connected to a first resistor;
the demodulator includes a second operational amplifier connected to a second resistor; and
the gain is further set by a ratio between the first resistor and the second resistor.

7. The power converter according to claim 6, wherein the first operational amplifier is connected in a negative feedback path to a first digital-to-analog converter, and wherein the first reference signal is a reference current applied to the first digital-to-analog converter.

8. An isolated error amplifier, comprising:
an amplifier, based on an output signal of a power converter and a reference signal, generating an analog error signal;
a modulator, based on the analog error signal, generating a digital modulated error signal;
an isolator, based on the digital modulated error signal, generating a digital isolated modulated error signal; and
a demodulator, based on the digital isolated modulated error signal, generating an analog isolated error signal, that is substantially proportional to the difference between the output signal and the reference signal,
wherein a gain in generating the analog isolated error signal from the analog error signal is set by a ratio between a first reference signal generated by the modulator and a second reference signal generated by the demodulator.

9. The isolated error amplifier according to claim 8, wherein the isolator comprises a primary coil receiving the digital modulated error signal and a secondary coil generating the digital isolated modulated error signal.

10. The isolated error amplifier according to claim 9, wherein the primary coil is coupled to the secondary coil in an induction coupling configuration.

11. The isolated error amplifier according to claim 8, wherein the amplifier comprises a wide band amplifier.

12. A linear isolator, comprising:
a modulator, based on an analog input signal, generating a digital modulated input signal;
an isolator, passing the digital modulated input signal across an isolation barrier to generate a digital isolated modulated input signal; and
a demodulator, based on the digital isolated modulated input signal, generating an analog isolated output signal, that is substantially proportional to the analog input signal,
wherein the linear isolator has a gain, that is a ratio of the analog isolated output signal and the analog input signal, and
wherein the gain of the linear isolator is set by a ratio between a first reference signal generated by the modulator and a second reference signal generated by the demodulator.

13. A method, comprising:
generating, by an amplifier, an analog error signal based on an output signal of the power converter and a first reference signal;
generating, by a modulator, a digital modulated error signal based on the analog error signal;
generating, by an isolator, a digital isolated modulated error signal based on the digital modulated error signal;
generating, by a demodulator, an analog isolated error signal based on the digital isolated modulated error signal; and
controlling, by a controller, a power stage based on the analog isolated error signal, to generate the output signal of the power converter,
wherein a gain in generating the analog isolated error signal from the analog error signal is set by a ratio between a second reference signal generated by the modulator and a third reference signal generated by the demodulator.

14. The method according to claim 13, wherein the modulator modulates via one of amplitude modulation, frequency modulation, pulse width modulation, and pulse density modulation.

15. The method according to claim 13, wherein the demodulator demodulates via one of amplitude demodulation, frequency demodulation, pulse width demodulation, and pulse density demodulation.

16. The method according to claim 13, wherein the isolator comprises a primary coil receiving the digital modulated error signal and a secondary coil generating the digital isolated modulated error signal.

17. The method according to claim 16, wherein the primary coil is coupled to the secondary coil in an induction coupling configuration.

18. The method according to claim 13, wherein the controller comprises an error comparator that controls the power stage based on the isolated error signal.

19. The method according to claim 13, wherein:
the modulator includes a first operational amplifier connected to a first resistor;
the demodulator includes a second operational amplifier connected to a second resistor; and
the gain is further set by a ratio between the first resistor and the second resistor.

20. The method according to claim 19, wherein the first operational amplifier is connected in a negative feedback path to a first digital-to-analog converter, and wherein the first reference signal is a reference current applied to the first digital-to-analog converter.

* * * * *